Jan. 16, 1945.   G. E. EVANS ET AL   2,367,270
SEPTIC TANK
Filed Feb. 16, 1942   2 Sheets-Sheet 1
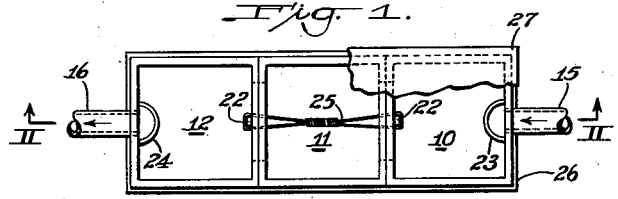
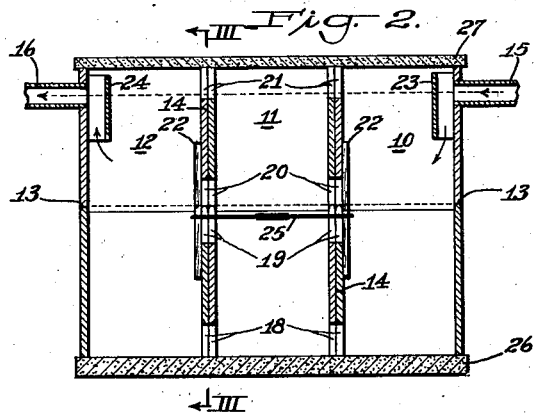
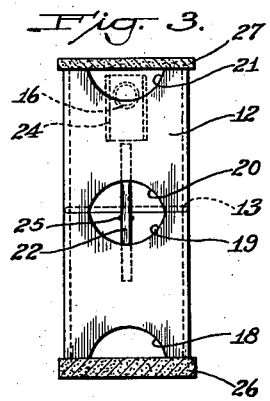
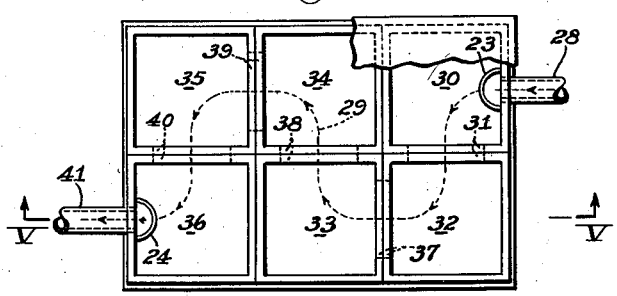
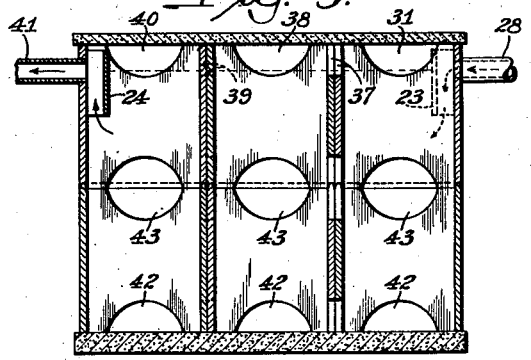
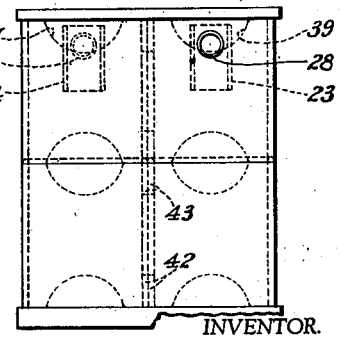
INVENTOR.
GEORGE E. EVANS.
&
IRWIN GUTMAN.
BY Archworth Martin
ATTORNEY.

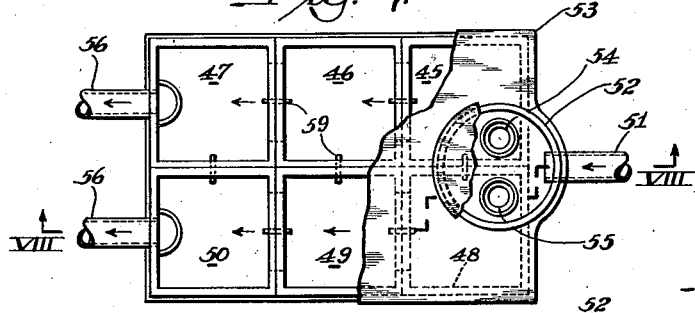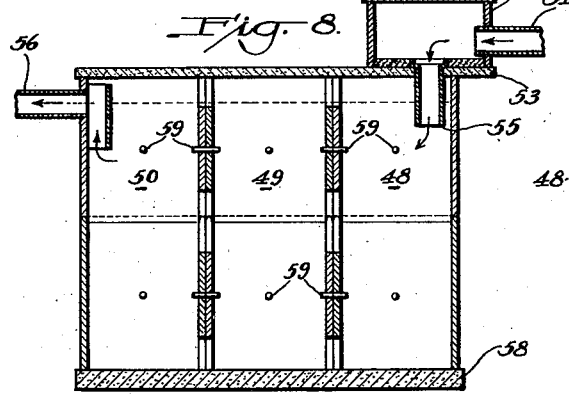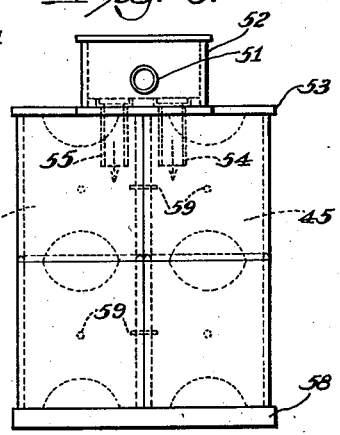

Patented Jan. 16, 1945

2,367,270

UNITED STATES PATENT OFFICE 2,367,270

SEPTIC TANK

George E. Evans, Pittsburgh, Pa., and Irwin Gutman, Lynbrook, N. Y.

Application February 16, 1942, Serial No. 431,002

4 Claims. (Cl. 210—6)

Our invention relates to septic tanks for the disposal of sewage, and more particularly to septic tanks of a multi-chamber form.

One object of our invention is to provide septic tank structure of such form that, given a number of units of standard forms, they can be conveniently arranged in multiples, without the use of connecting pipes that are subject to clogging, to form a desired number of sewage digestion chambers, in accordance with the quantity of sewage to be cared for by a particular installation.

Another object of our invention is to provide a septic tank structure of multiple-chamber arrangement, wherein communicating openings or passageways are so located and of such form that bacteria mats will readily be formed in all of the chambers of a series, and wherein there will be in effect a continuous mat extending throughout all of the chambers, and also more uniform distribution of sludge in the bottoms of the chambers.

While our invention is hereinafter described as having units which may conveniently be formed of clay such as that employed in the making of sewer pipes or flue liners, it will be understood that the tanks herein described can be made of other materials, including metal.

Some of the forms which our invention may take are shown in the accompanying drawings, wherein Figure 1 is a plan view of a septic tank structure, with a portion of its cover broken away; Fig. 2 is a view taken on the line II—II of Fig. 1; Fig. 3 is an elevational view of one of the chambers of Fig. 2, looking in the direction of the arrows III—III; Fig. 4 is a plan view of another arrangement of septic tank chambers, with a portion of the cover broken away; Fig. 5 is a view taken on the line V—V of Fig. 4; Fig. 6 is an end view of the structure of Fig. 5; Fig. 7 is a view similar to that of Fig. 4, but showing still another arrangement of digestion chambers; Fig. 8 is a view taken on the line VIII—VIII of Fig. 7; Fig. 9 is an end view of the structure of Fig. 8.

Referring first to Figs. 1 to 3, we show a structure wherein three chambers 10, 11 and 12 are provided. While each of these chambers could be formed of a single piece of material, we show them as composed of upper and lower sections that are complementally beaded and grooved as shown at 13, so that the upper and lower sections will be maintained in proper vertical alignment with one another. The joint at 13 may be sealed against leakage by the use of a sewer joint compound, such as one having an asphalt content, or by a mortar made of fire clay or the like. A similar sealing material can be employed between the contacting faces of the chamber walls as at the points 14, when assembling the units, to prevent leakage. A very thin layer of the plastic sealing material will be sufficient.

The sections as here shown may suitably be formed of clay after the manner of flue liners, which are usually made by the extrusion method and then cut to suitable lengths. Also, they can be formed of concrete. When so formed, they can have the openings cut therein while green, including openings for an inlet pipe 15 and an outlet or effluent pipe 16. Likewise the ends of the sections may be cut away at 18, 19, 20 and 21, to provide passages for the flow of the sewage. While the parts are still green, inlet and outlet baffles 23 and 24 respectively of green clay can be pressed into place. Also, the beads and grooves at 13 can be then formed. Thereafter the parts, in disassembled relation, can be fired in accordance with the usual practice in the art of making sewer pipe and the like. If desired, the effluent pipe 16 may discharge into an effluent chamber of conventional form.

After firing of the sections, they can be brought together in assembled relation at a place of installation, as shown in Figs. 1 to 3, a suitable concrete foundation or bed plate 26 being first provided. The sections can be placed while the base 26 is still slightly soft, or a sealing compound used, to prevent leaking. This bed plate 26 serves as a bottom for all of the chambers, but it will be understood that each chamber can be provided with an individual bottom.

It will be seen that the elements are so arranged as to have their openings 18, 19, 20 and 21, respectively, in alignment. It will also be seen that if only a two-chamber arrangement is required, the elements that compose the middle chamber 11 will be omitted and the chambers 10 and 12 placed in abutting relation. Similarly, if more than three chambers are required, additional chambers 11 can be inserted between the chambers 10 and 12.

The passageway formed by the openings 18 permit the filling of the chambers simultaneously to a common level, and the passageways at 21 not only permit flow from the inlet chamber to the outlet chamber when the sewage in the tank is at its normal level, but also permits the forming of a continuous bacteria mat, extending through all of the chambers. It will be seen that the passageways at 21 are of sufficient width that a substantial rate of flow can take place from one chamber to the other, without the current flow being sufficiently strong to break up the bacteria mat. Also, they extend to planes above and below the normal level of flow at the outlet 16 and are of greater area than the outlet. The openings at 18 permit of the passage of the less buoyant solids that enter at the inlet 15 from the inlet chamber to the other chambers, in which other chambers these solids will gradually rise to assist in forming a bacteria mat. The passageways at 19—20 permit longer use of the tank structure between cleaning out periods, since if non-digestible sludge fills up the lower portions of the chambers, clogging the openings 18, communication between the tanks will still be had at 19—20, below the plane of the baffles 23—24.

In order to hold the tank sections firmly together until the sealing material hardens and until the earth has been filled in and tamped around the tank, which is usually set in a pit, we provide a clamping device which comprises strips 22 of wood or other suitable material that are drawn together by twisting a wire or rope 25 that extends through the openings 19—20 and around the strips. These members 22 and 25 can be removed after completion of the installation or can be allowed to remain in place.

By providing the cut-outs in the adjacent walls of the sections, instead of employing pipe connections between the sections, the structure can be made more compact and more cheaply, and with less danger of clogging. A suitable cover 27 is provided to permit of convenient access for cleaning and for removing any obstructions at the baffles 23—24.

In Figs. 4, 5 and 6, we show an arrangement wherein the individual sections are formed somewhat as in Figs. 1 to 3, but wherein a plurality of the chambers are grouped in rectangular forms instead of rectilinear alignment, the passageways being so formed that there will be tortuous flow through the various chambers as indicated by the broken line 29. In this arrangement, the first chamber 30 has its upper opening 31 cut through a wall to one side of the inlet sewer 28 instead of directly to the front thereof, and the adjacent opening 31 of chamber 32 has its uppermost cut-out 31 in alignment with the opening through the wall of chamber 30. The succeeding chambers 33, 34, 35, 36, all have communicating openings at 37, 38, 39 and 40, so as to provide a tortuous path of flow to an effluent or outlet pipe 41. The sections are provided with bottom openings 42 and intermediate openings 43 beneath their upper openings or passageways, at 31, 37, 38, 39 and 40, in the same relative arrangement as are the openings 18, 19, 20 and 21 of Fig. 3, so that there will be communication between the chambers at various levels. In this arrangement, as in the case of Fig. 1, there can be a bacteria mat formed that extends throughout the entire surface area of the chambers. Also, the sludge will be distributed throughout a number of chambers, thus requiring less frequent cleaning out. The tortuous path gives a longer line of flow in a limited space and therefore results in a longer time for settling of the solids and a more clarified effluent at the outlet.

Referring now to Figs. 7 to 9, we show an arrangement wherein two series of septic tank chambers are arranged in parallel relation. The one series comprises chambers 45, 46 and 47, which communicate with one another in the same manner as do the chambers 10, 11 and 12 of Fig. 1, and the chambers 48, 49 and 50 communicate with one another, in like manner. A sewage inlet pipe 51 is provided that is common to the two series of chambers. The pipe 51 extends into a chamber 52 that is suitably mounted on the cover 53 and communicates through pipes 54 and 55 with the chambers 45 and 48 respectively, the flow from the inlet sewer 51 being approximately evenly distributed to the pipes 54 and 55, and thence to the two series of chambers. While each series of chambers has separate effluent pipes 56, it will be understood that said pipes can be connected to a common effluent line at some point exteriorly of the septic tank structure. It will also be understood that if for any reason it is desired to discontinue use of one of the series of chambers, one of the pipes 54 or 55 can be closed.

In this instance, as in the case of the other figures, sealing compound can be placed between the abutting faces of the chambers. If it is desired to avoid delay in installation, incident to waiting for the concrete base 58 to harden, the units comprising the chambers can be assembled on the base while it is still somewhat soft and be temporarily maintained in alignment and against relative settling by the use of wooden plugs or wedges 59 driven through holes provided in the sides of the chambers, and these plugs will maintain the parts in properly fitting relation until the concrete base has entirely hardened. A similar temporary interlocking arrangement can be provided for the structures of various of the other figures.

We claim as our invention:

1. Septic tank structure comprising a plurality of chambers of generally rectangular form in their horizontal planes and sequentially arranged in side-by-side abutting relation, the abutting walls of the chambers having cut-out areas at their upper and lower edges, to provide passageways between the chambers, a base plate closing the lower extremities of the chambers and supporting them in relatively assembled relation, and means covering said chambers, inlet and outlet openings being provided at opposite ends of the series of assembled chambers.

2. Septic tank structure comprising a plurality of chambers each of which is of generally rectangular form in horizontal cross section, the chambers being sequentially arranged with adjacent side walls in abutting relation, the uppermost and lowermost portions of said walls being partly cut away to provide communication between the chambers, the first chamber of the series having an inlet opening and the last chamber of the series having an outlet opening, and the uppermost passageways extending to planes above and below the normal level of flow at the outlet opening, and a base-plate for the structure.

3. Septic tank structure comprising a plurality of chambers arranged in abutting side-by-side relation, in directions both longitudinally and transversely of the structure, sequentially arranged openings being provided through the abutting walls, in transverse and longitudinal directions, successively, whereby a tortuous path of flow is provided from one end of the structure to the opposite end thereof, inlet and outlet openings being provided at opposite ends of the series of assembled chambers, and a base-plate for the structure.

4. Septic tank structure comprising inlet and outlet chambers and an intermediate chamber, each comprising elements of generally rectangular form in cross section and arranged in side-by-side upright position, with their side walls in abutting relation, the abutting side walls being cut away at their upper and lower ends to form passageways, inlet and outlet means for the tank structure, and a base plate therefor, each chamber comprising a tubular member that is adapted to have placed thereon another tubular member with similarly arranged cut-out areas at its ends.

GEORGE E. EVANS.
IRWIN GUTMAN.